(12) United States Patent
Kim

(10) Patent No.: US 10,822,151 B2
(45) Date of Patent: Nov. 3, 2020

(54) SHOCK-ABSORBING PACKING BOX

(71) Applicant: Reco Co., Ltd., Gyeonggi-do (KR)

(72) Inventor: Young Soo Kim, Hanam-si (KR)

(73) Assignee: Reco Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/081,862

(22) PCT Filed: Feb. 27, 2017

(86) PCT No.: PCT/KR2017/002133
§ 371 (c)(1),
(2) Date: Aug. 31, 2018

(87) PCT Pub. No.: WO2017/150857
PCT Pub. Date: Sep. 8, 2017

(65) Prior Publication Data
US 2019/0062027 A1     Feb. 28, 2019

(30) Foreign Application Priority Data

Mar. 3, 2016  (KR) .................. 10-2016-0025568
Mar. 3, 2016  (KR) .................. 10-2016-0025571

(51) Int. Cl.
| | | |
|---|---|---|
| *B65D 81/02* | (2006.01) | |
| *B29D 22/02* | (2006.01) | |
| *B65D 81/03* | (2006.01) | |
| *B65D 85/30* | (2006.01) | |
| *F16F 9/04* | (2006.01) | |

(Continued)

(52) U.S. Cl.
CPC ......... *B65D 81/022* (2013.01); *B29D 22/003* (2013.01); *B29D 22/02* (2013.01); *B65D 81/03* (2013.01); *B65D 81/052* (2013.01); *B65D 85/30* (2013.01); *F16F 9/04* (2013.01)

(58) Field of Classification Search
USPC ......................................................... 206/522
See application file for complete search history.

(56) References Cited

U.S. PATENT DOCUMENTS

2007/0053615 A1 * 3/2007 Liu ................ B65D 31/04
                                                   383/3
2009/0127153 A1 * 5/2009 Kim ................ B65D 81/052
                                                   206/522

(Continued)

FOREIGN PATENT DOCUMENTS

| JP | 2005-162268 A | 6/2005 |
|---|---|---|
| KR | 20-0397141 Y1 | 9/2005 |
| KR | 10-0767578 B1 | 10/2007 |

(Continued)

OTHER PUBLICATIONS

International Search Report dated Jun. 26, 2017, issued in corresponding International Application No. PCT/KR2017/002133, filed Feb. 27, 2017, 2 pages.

*Primary Examiner* — Jacob K Ackun
(74) *Attorney, Agent, or Firm* — Christensen O'Connor Johnson Kindness PLLC

(57) ABSTRACT

Provided is a shock-absorbing packing box, in which a pair of inner shells are partially fused between a pair of outer shells to constitute a shock-absorbing packing material having a plurality of air cells, and when air is filled into the air cells, the plurality of air cells filled with the air are connected in an overall box-shaped structure.

6 Claims, 17 Drawing Sheets

(51) Int. Cl.
    *B65D 81/05*     (2006.01)
    *B29D 22/00*     (2006.01)

(56) References Cited

U.S. PATENT DOCUMENTS

| | | | |
|---|---|---|---|
| 2013/0168286 A1* | 7/2013 | Liao | B65D 81/052 |
| | | | 206/522 |
| 2015/0144520 A1* | 5/2015 | Liao | B65D 81/052 |
| | | | 206/522 |

FOREIGN PATENT DOCUMENTS

| | | | |
|---|---|---|---|
| KR | 10-0921883 B1 | 10/2009 | |
| KR | 10-1563191 B1 | 10/2015 | |

\* cited by examiner

SHOCK-ABSORBING PACKING BOX

TECHNICAL FIELD

The present disclosure relates to a shock-absorbing packing box, and more particularly, to a shock-absorbing packing box, in which a pair of inner shells are partially fused between a pair of outer shells to constitute a shock-absorbing packing material having a plurality of air cells, and when air is filled into the air cells, the plurality of air cells filled with the air are connected in an overall box-shaped structure, whereby a packing means having a stable structure with a box shape is provided, and concurrently, shock-absorbing performance is improved, and furthermore, when the shock-absorbing packing material forming the shock-absorbing packing box is formed, at least one auxiliary inner shell is additionally provided so as to be alternately and partially fused with the pair of outer shells between the pair of outer shells forming the air cells, to constitute a shock-absorbing packing material having a plurality of air cells formed in a multi-layered structure, whereby air article is more safely protected by improving impact resistance through the air cells formed in the multi-layered structure as configured above, and particularly, the shock-absorbing packing box is usefully used to pack an article needing to be kept warm or cold.

BACKGROUND ART

In general, when an article is packed, the article is put and packed in a paper box. In this case, since the paper box only packs the article and does not provide a shock-absorbing and protecting function, the article is easily damaged by an external impact or the like during transportation of the paper box.

Therefore, when an article is easily damaged or likely to be damaged during transportation thereof, it is necessary to protect the article from an external impact. In this case, a lot of air cell type shock-absorbing packing materials, capable of wrapping and shock-absorbing an article, are used.

The air cell type shock-absorbing packing material is used to facilitate an operation of injecting air into air cells, and concurrently, to prevent air from leaking to the outside of the air cells when air is injected into the air cell by inserting a structure having an inner shell between outer shells forming the air cells.

Recently, a lot of pocket type shock-absorbing packing materials have been used, wherein the pocket type shock-absorbing packing material is formed by fusing and forming such a shock-absorbing packing material into the form of a pocket, is able to easily accommodate an article inside a pocket of the pocket type shock-absorbing packing material, and is able to easily protect the article through shock-absorbing of air cells.

FIG. 1 is a diagram illustrating a state in which an article is accommodated in a pocket type shock-absorbing packing material.

As illustrated in FIG. 1, a pocket type shock-absorbing packing material 10 is formed in a pocket type in which an opening 11 is formed in an upper portion thereof and an article accommodation portion configured to accommodate an article 1 introduced through the opening 11 is formed therein. Commonly, the pocket type shock-absorbing packing material 10 is manufactured in accordance with a size of the accommodated article 1 such that air cells 12 formed in the article accommodation portion and the article 1 come into close contact with each other when the article 1 is accommodated.

However, in the case of the above-described pocket type shock-absorbing packing material 10, it is easy to accommodate and pack articles such as a document, a book, and a frame. However, it is difficult to accommodate and pack articles having various shapes such as cylindrical or hexahedral articles.

Therefore, recently, a box type shock-absorbing packing box has been developed. As examples of the box type shock-absorbing packing box, a shock-absorbing packing box formed by integrally attaching a shock-absorbing packing material having air cells to an inner wall of a packing paper box is disclosed in Korean Application Patent Publication No. 2010-0118506 and Korean Patent Registration No. 0428982.

However, in the case of Korean Application Patent Publication No. 2010-0118506, a shock-absorbing sheet having a plurality of air caps is attached to a wall of a packing paper box to protect an article accommodated in the box through the plurality of air caps attached to the shock-absorbing sheet. However, since a plurality of a small-sized air caps are used and a non-shock-absorbing space between the air caps is relatively wide, shock-absorbing performance is relatively low. In addition, since a separate shock-absorbing packing material is attached to an inner wall of the packing paper box, a manufacturing process is complicated, and thus, manufacturing costs are increased.

In addition, in the case of Korean Patent Registration No. 0428982, a shock-absorbing sheet having a plurality of air cells is attached to a wall of a packaging paper box to protect an article accommodated in the box. However, since a packing paper box is manufactured and then a separate shock-absorbing packing material should be attached to an inner surface of the packing paper box in a manufacturing process, manufacturing process is complicated, and thus, manufacturing costs are increased.

DISCLOSURE

Technical Problem

Various embodiments are directed to provide a shock-absorbing packing box, in which a pair of inner shells are partially fused between a pair of outer shells to constitute a shock-absorbing packing material having a plurality of air cells, and when air is filled into the air cells, the plurality of air cells filled with the air are connected in an overall box-shaped structure, whereby a packing means having a stable structure with a box shape is provided, and concurrently, shock-absorbing performance is improved, and furthermore, when the shock-absorbing packing material forming the shock-absorbing packing box is formed, at least one auxiliary inner shell is additionally provided so as to be alternately and partially fused with the pair of outer shells between the pair of outer shells forming the air cells, to constitute a shock-absorbing packing material having a plurality of air cells formed in a multi-layered structure, whereby air article is more safely protected by improving impact resistance through the air cells formed in the multi-layered structure as configured above, and particularly, the shock-absorbing packing box is usefully used to pack an article needing to be kept warm or cold.

Technical Solution

In an embodiment, a shock-absorbing packing box includes: a shock-absorbing packing material including a plurality of air cells, wherein the shock-absorbing packing material includes an upper outer shell and a lower outer shell which are partially fused to each other to form a plurality of first air cells with an embossed shape, provided to communicate with each other in a lengthwise direction of the outer shells at a central portion of the outer shells, to form a plurality of second air cells with an embossed shape, spaced apart from each other by a certain distance in the lengthwise direction of the outer shells at both sides of the central portion of the outer shells and provided to communicate with the first air cells, and to form an air injection path configured to inject air into the first air cells at a front end of the outer shells; and an upper inner shell and a lower inner shell which are interposed between the upper outer shell and the lower outer shell and are partially fused to each other to form air inflow paths configured to allow the first air cells and the air injection path to communicate with each other, wherein the upper outer shell and the lower outer shell are partially fused to form an edge fused portion along an edge of the outer shells, and concurrently, to form a plurality of longitudinal fused portions and a plurality of transverse fused portions on the outer shells, configured to divide a front surface, a rear surface, a bottom surface, both side walls, and upper covers constituting the shock-absorbing packing box, and a plurality of point fused portions configured to fuse the upper outer shell and the lower outer shell in a certain pattern are formed on the outer shells forming the front surface, the rear surface, the bottom surface, the both side walls, and the upper covers, to form the plurality of first air cells with the embossed shape, which constitute the front surface, the rear surface, the bottom surface, and the upper covers of the shock-absorbing packing box at the central portion of the outer shells in the lengthwise direction of the outer shells, and to form the plurality of second air cells with the embossed shape, which are spaced apart from each other by a certain distance and constitute the both side walls of the shock-absorbing packing box at both sides of the outer shells in the lengthwise direction of the outer shells, wherein in a state in which the shock-absorbing packing material is folded in a shape in which a front end and a rear end thereof come into contact with each other, both side edges of the folded shock-absorbing packing material are fused to each other, and then, air is injected through the air injection path to form the front surface, the rear surface, the bottom surface, and the upper covers of the box through the plurality of first air cells, and concurrently, except for portions of the outer shells, where the plurality of second air cells are formed, both side portions of the outer shells are tucked in the box to form the both side walls of the box through the plurality of second air cells and to form a box shape.

Advantageous Effects

In accordance with a shock-absorbing packing box in accordance with the present disclosure, a shock-absorbing packing material having a plurality of air cell structures may be formed into a box shape to form the shock-absorbing packing box, thereby providing a packing means having a stable structure with a box shape and concurrently more safely protecting an article accommodated in the box through the plurality of air cell structures.

Furthermore, in a case in which a shock-absorbing packing box is formed using a shock-absorbing packing material having a plurality of air cells formed in a multi-layered structure, when an article is packed, the article may be more safely protected by improving impact resistance through the air cells formed in the multi-layered structure. In particular, a heat transfer between the inside and the outside of the packing material through portions where the air cells are connected to each other may be effectively blocked due to the air cells formed in the two-layered structure, which are alternately stacked, so that the shock-absorbing packing box may have an excellent thermal insulation effect when an article is packed and thus may be usefully used to pack an article needing to be kept warm or cold.

MODE FOR INVENTION

Figure 1:
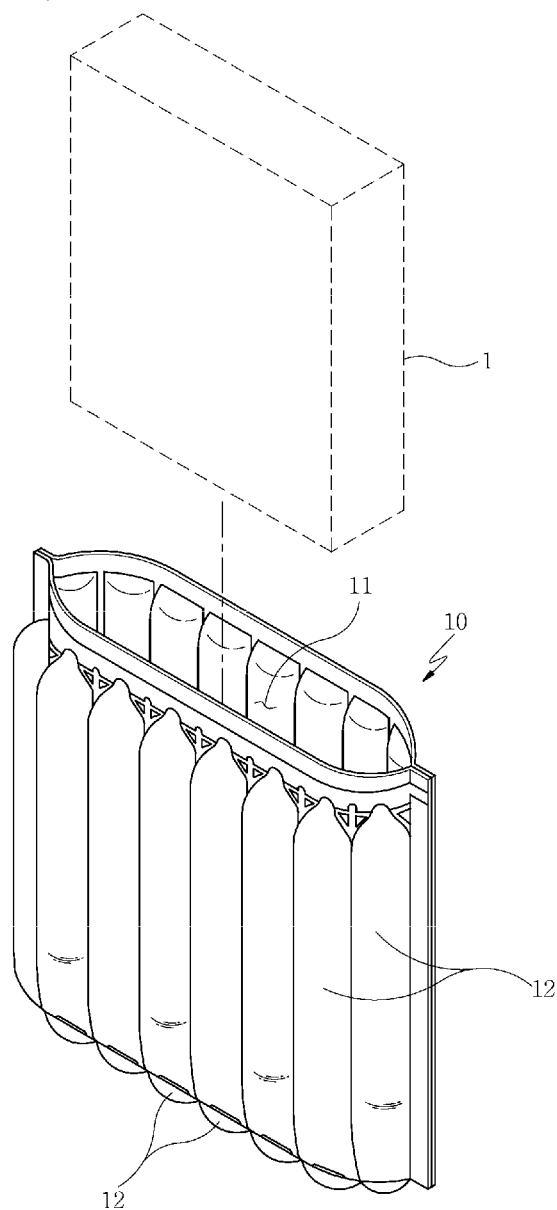
FIG. 1 is a diagram illustrating a pocket type shock-absorbing packing material in accordance with in accordance with the related art.

Hereafter, embodiments of the present disclosure will be described in detail, but it is to be noted that the present disclosure is not limited to the following embodiments without departing from the gist of the present disclosure.

A shock-absorbing packing box in accordance with the present disclosure is formed by forming a shock-absorbing packing material having a plurality of air cell structures into a box shape. Among embodiments to be described below, a shock-absorbing packing box formed by forming a shock-absorbing packing material having a plurality of air cell structures with an embossed shape into a box shape will be described in a first embodiment, and a shock-absorbing packing box formed by forming a shock-absorbing packing material having a plurality of separate air cell structures extending in a longitudinal direction of outer shells into a box shape will be described in a second embodiment.

Prior to making descriptions, it is to be noted that the terms "upper," "lower," "front end", and "rear end" to be mentioned in the following descriptions are terms that are selected on the basis of the drawings to facilitate the understanding of the present disclosure. In a shock-absorbing packaging material illustrated in FIGS. 2 and 3, in accordance with a stacking sequence of outer shells or inner shells, a lower portion will be explained by using the term "lower" and an upper portion will be explained by using the term "upper," and the upper ends of air cells in which air inflow paths 142 are formed will be explained by using the term "front end" and the lower ends of the air cells opposite to the upper ends will be explained by using the term "rear end."

In addition, in the drawings, the short-width sides of the air cells represent a transverse direction and the long-width sides of the air cells represent a longitudinal direction, and the solid lines shown inside sheets (an upper outer shell, a lower outer shell, an auxiliary inner shell, an upper inner shell, and a lower inner shell) indicate fused portions which are formed on upper surfaces and the dotted lines indicate fused portions which are formed on lower surfaces.

Hereinafter, a shock-absorbing packing box in accordance with a first embodiment of the present disclosure will be described.

Figure 2:
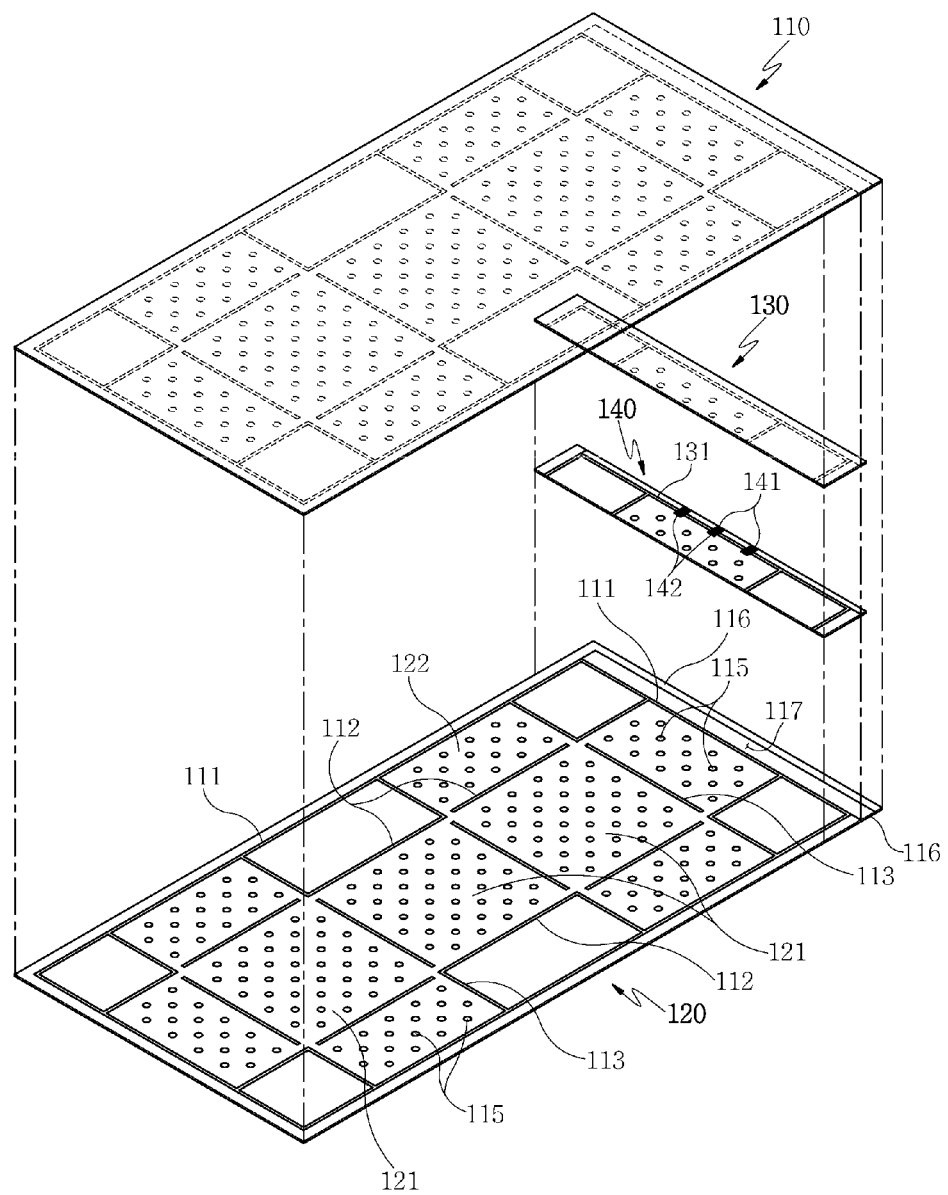
FIG. 2 is an exploded perspective view illustrating a configuration of a shock-absorbing packing material constituting a shock-absorbing packing box in accordance with a first embodiment of the present disclosure.
Figure 3:
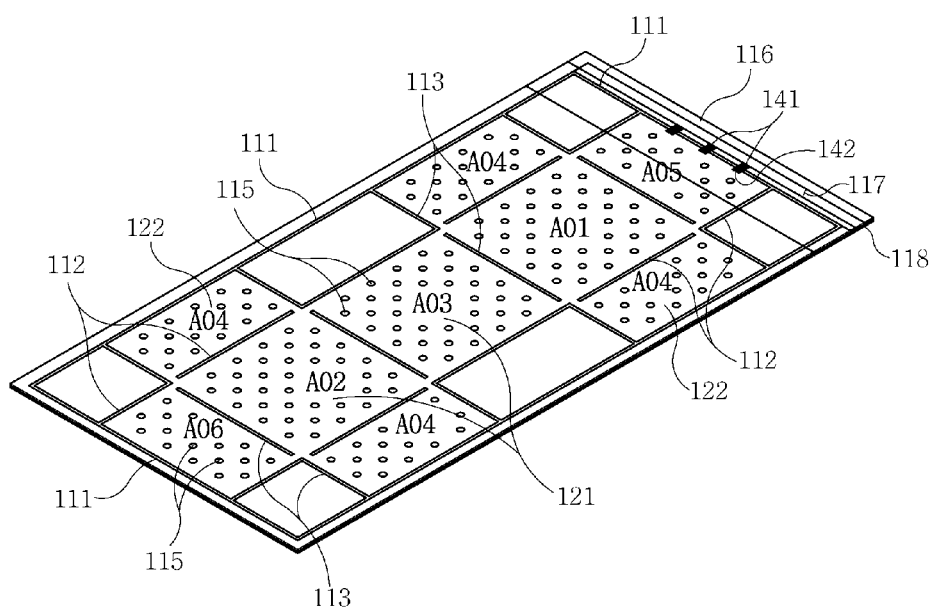
FIG. 3 is a development view illustrating the shock-absorbing packing material constituting the shock-absorbing packing box in accordance with the first embodiment of the present disclosure.
Figure 4:
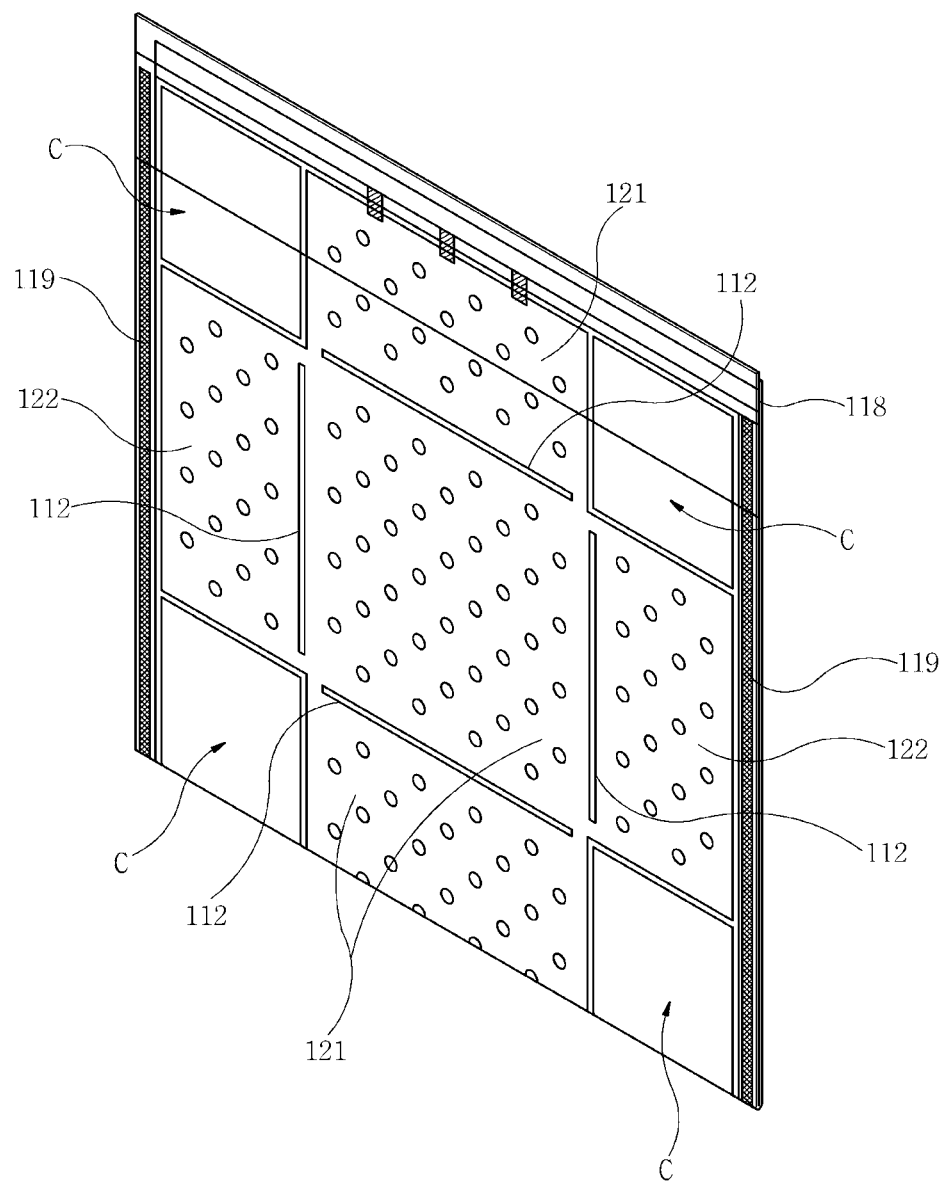
FIGS. 4 and 5 are views illustrating processes of forming the shock-absorbing packing box through the shock-absorbing packing material developed in the first embodiment of the present disclosure.
Figure 5:
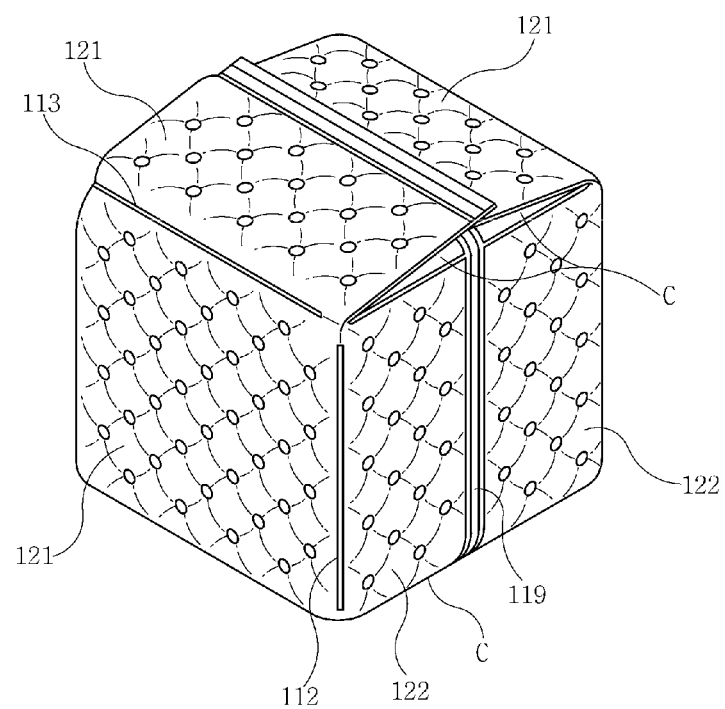

FIG. 2 is an exploded perspective view illustrating a configuration of a shock-absorbing packing material constituting the shock-absorbing packing box in accordance with the first embodiment of the present disclosure. FIG. 3 is a development view illustrating the shock-absorbing packing material constituting the shock-absorbing packing box in accordance with the first embodiment of the present disclosure. FIGS. 4 and 5 are views illustrating processes of forming the shock-absorbing packing box through the shock-absorbing packing material developed in the first embodiment of the present disclosure.

As illustrated in FIGS. 2 to 5, the shock-absorbing packing box in accordance with the first embodiment of the present disclosure includes the shock-absorbing packing material. The shock-absorbing packing material includes an upper outer shell 110 and a lower outer shell 120 which are partially fused to each other to form a plurality of first air cells 121 with an embossed, provided to communicate with each other in a lengthwise direction of the outer shells at a central portion of the outer shells, to form a plurality of second air cells 122 with an embossed shape, spaced apart from each other by a certain distance in the lengthwise direction of the outer shells at both sides of the central portion of the outer shells and provided to communicate with the first air cells 121, and to form an air injection path 117 configured to inject air into the first air cells 121 at a front end of the outer shells; and an upper inner shell 130 and a lower inner shell 140 which are interposed between the upper outer shell 110 and the lower outer shell 120 and are partially fused to each other to form air inflow paths 142 configured to allow the first air cells 121 and the air injection path 117 to communicate with each other. In a state in which the shock-absorbing packing material is folded in a shape in which a front end and a rear end thereof come into contact with each other, both side edges of the folded shock-absorbing packing material are fused to each other, and then, air is injected through the air injection path 117 to form a front surface, a rear surface, a bottom surface, and upper covers of the box through the plurality of first air cells 121, and concurrently, to form side walls of the box through the plurality of second air cells 122, thereby forming a box shape.

That is, in accordance with the shock-absorbing packing box in accordance with the first embodiment of the present disclosure as configured above, a pair of inner shells (upper inner shell and lower inner shell) are partially fused between a pair of outer shells (upper outer shell and lower outer shell) to form a shock-absorbing packing material having a plurality of air cells with an embossed shape. When air is filled into the air cells, the air cells with the embossed shape, filled with the air, may be connected to form an overall box-shaped structure, thereby providing a packing means having a stable box-shaped structure, and concurrently, safely protecting an article accommodated in the box through the air cells with the embossed shape.

First, each element of the shock-absorbing packing material constituting a development view of the shock-absorbing packing box in accordance with the first embodiment of the present disclosure as configured above will be described in detail with reference to FIGS. 2 and 3.

As illustrated in FIG. 2, the upper outer shell 110 and the lower outer shell 120 are composed of a film made of a synthetic resin or the like and have the same size.

In addition, the upper inner shell 130 and the lower inner shell 140 are also composed of a film made of a synthetic resin or the like and are formed to have the same length as the upper outer shell 110 and the lower outer shell and 120 in the transverse direction and to have a shorter length than the upper outer shell 110 and the lower outer shell 120 in the longitudinal direction.

In addition, a plurality of backing members 141 are formed at a central portion of a front edge of the lower inner shell 140. The backing members 141 function to prevent the lower inner shell 140 and the upper inner shell 130 from being fused to each other when the upper inner shell 110 and the lower inner shell 120 are fused.

In such a configuration, the upper inner shell 130 is disposed on the lower inner shell 140 so as to overlap the lower inner shell 140. Then, the overlapped upper and lower inner shells 130 and 140 are disposed below the upper outer shells 110. The upper outer shell 110 and the upper and lower inner shells 130 and 140 are partially fused to form an inner fused portion 131 and to fuse the upper outer shell 110 and the upper and lower inner shells 130 and 140 to each other. In this case, the air inflow paths 142 communicating with the air injection path 117 are formed at portions of the inner fused portion 131, where the backing members 141 are formed.

After that, the upper and lower outer shells 110 and 120 and the upper and lower inner shells 130 and 140 are partially fused in the longitudinal direction and the transverse direction to form a plurality of air cells and the air injection path 117 communicating with an air cell at the front end of the upper and lower outer shells 110 and 120, thereby forming the shock-absorbing packing material which constitutes the development view of the shock-absorbing packing box in accordance with the present embodiment.

That is, specifically describing such a process, as illustrated in FIGS. 2 and 3, the upper and lower outer shells 110 and 120 and the upper and lower inner shells 130 and 140 are concurrently fused to form an edge fused portion 111 along an edge of the outer shells and to concurrently form a plurality of longitudinal fused portions 112 and a plurality of transverse fused portions 113 on the outer shells, configured to divide and form a front surface, a rear surface, a bottom surface, both side walls, and a pair of upper covers constituting the shock-absorbing packing box. A plurality of point fused portions 115 configured to fuse the upper outer shell 110 and the lower outer shell 120 in a certain pattern are formed on the front surface A01, the rear surface A02, the bottom surface A03, the both side walls A04, and the pair of upper covers A05 and A06 as formed above, and thus, the plurality of first air cells 121 with the embossed shape, which constitute the front surface A01, the rear surface A02, the bottom surface A03, and the pair of upper covers A05 and A06 of the shock-absorbing packing box, are formed at the central portion of the outer shells in the lengthwise direction of the outer shells, and the plurality of second air cells 122 with the embossed shape, which are spaced apart from each other by a certain distance, are formed at both sides of the outer shells in the lengthwise direction of the outer shells to constitute the both side walls A04 of the shock-absorbing packing box through the plurality of second air cells 122.

In such a configuration of the present embodiment, FIG. 3 illustrates that the first air cells 121 with the embossed shape, which constitute the first upper cover A05, the front surface A01, the bottom surface A03, the rear surface A02, and the second upper cover A06 of the shock-absorbing packing box, are sequentially formed from a front end to a rear end of the central portion of the outer shells, and illustrates that the second air cells 122 with the embossed shape, which respectively constitute both side walls A04 of the shock-absorbing packing box, are formed at both sides of the front surface A01 and both sides of the rear surface A02 at both sides of the outer shells.

In this case, the plurality of longitudinal fused portions 112 and the plurality of the transverse fused portions 113, which divide the front surface A01, the rear surface A02, the bottom surface A03, the both side walls A04, and the pair of upper covers A05 and A06 constituting the shock-absorbing packing box, are each partially fused on the outer shells and thus are formed such that the plurality of first air cells 121 and the plurality of second air cells 122 communicate with each other through spaces between the fused portions.

In addition, the plurality of longitudinal fused portions 112 and the plurality of transverse fused portions 113, which divide the front surface, the rear surface, the bottom surface, the both side walls, and the pair of upper covers constituting the shock-absorbing packing box on the outer shells, function as folding lines such that the plurality of first air cells 121 and the plurality of second air cells 122 are folded into a box shape in a state of being filled with air.

Furthermore, a front fused portion 116 is formed at a front edge of the fused upper and lower outer shells 110 and 120 so as to be spaced from the edge fused portion 111. The front fused portion 116 forms the air injection path 117 together with the edge fused portion 111 fused at a front end of the first air cells 121.

In this case, an opened air injection port 118, through which air is injected, is formed at an end of the air injection path 117, and an end of the air injection path 117, which is opposite to the air injection port 118, is closed. In addition, the air injection path 117 communicates with the first air cell 121 disposed at the front end of the upper and lower outer shells 110 and 120 through the air inflow paths 142 formed by the backing members 141.

The shock-absorbing packing material having the above-described configuration is configured such that when air is injected through the air injection port 118, the air injected into the air injection path 117 is injected into the first air cell 121 disposed at the front end of the outer shells through the air inflow paths 142, and then, the air injected into the first air cell 121 is injected into other first air cells 121 successively disposed in rear of the first air cell 121 and is also injected into the second air cells 122 communicating with the first air cells 121.

Meanwhile, the shock-absorbing packing material as formed above is folded into a box shape to form the shock-absorbing packing box in accordance with the first embodiment of the present disclosure. Such a process of forming the box is as follows.

First, as illustrated in FIG. 4, in a state in which the developed shock-absorbing packing material is folded in a shape in which the front end and the rear end thereof come into contact with each other, both side edges of the folded shock-absorbing packing material are fused to each other to form side fused portions 119. In this case, the front end and the rear end in contact with each other maintain a separated state.

After that, as illustrated in FIGS. 4 and 5, after air is injected through the air injection port 118 formed in the upper and lower outer shells 110 and 120 (see FIG. 2) and then is filled into the plurality of first air cells 121 and the plurality of second air cells 122, the shock-absorbing packing material is folded along the transverse fused portions 113 dividing the plurality of the first air cells 121 to form the front surface, the rear surface, the bottom surface, and the pair of upper covers of the shock-absorbing packing box through the plurality of first air cells 121. In addition, the shock-absorbing packing material is folded along the longitudinal fused portions 112 between the first air cells 121 and the second air cells 122, and concurrently, side edges of the shock-absorbing packing material, which are fused by the side fused portions 119, are unfold to form the both side walls of the shock-absorbing packing box through the plurality of second air cells 122. In this case, except for the first and second air cells 121 and 122 in the folded shock-absorbing packing material, corners C of the outer shells, which are not injected with air, are tucked in a box to form the shock-absorbing packing box having an overall rectangular shape as illustrated in FIG. 5.

Here, the pair of covers formed on an upper portion of the shock-absorbing packing box may be configured such that opposite ends of the covers overlap each other or the covers entirely overlap each other to cover the opened upper portion of the shock-absorbing packing box.

In accordance with the shock-absorbing packing box in accordance with the present embodiment having the above-described configuration, the shock-absorbing packing material having air cell structures with the embossed shape may be formed into a box shape to form the shock-absorbing packing box, thereby providing a packing means having a stable structure with a box shape and concurrently more safely protecting an article accommodated in the box through the air cell structures with the embossed shape.

On the other hand, among embodiments of a shock-absorbing packing box having a plurality of air cell structures in accordance with the present disclosure, it has been described that a plurality of air cell structures are formed into a box shape to form a shock-absorbing packing box in the first embodiment. In addition, a plurality of air cell structures may be formed as separate air cell structures to form a shock-absorbing packing box. Hereinafter, a shock-absorbing packing box having the separate air cell structures will be described through a second embodiment.

Figure 6:
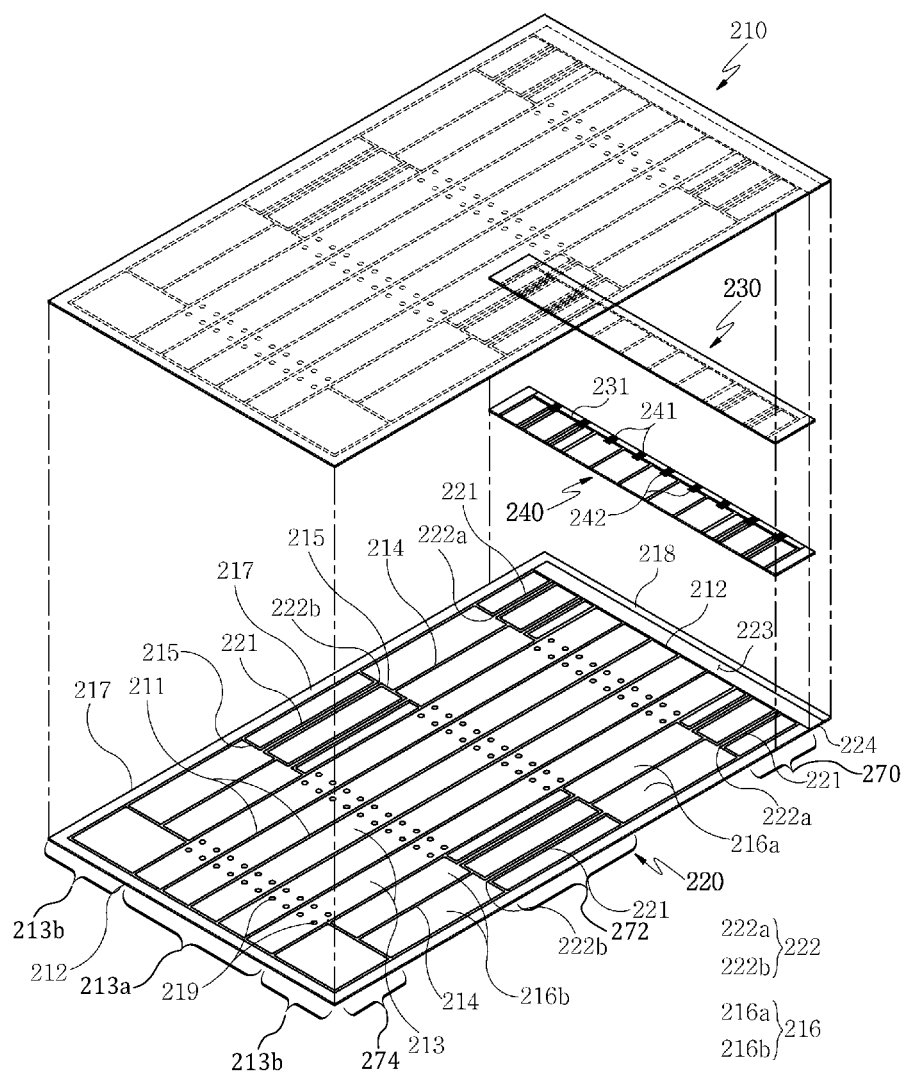
FIG. 6 is an exploded perspective view illustrating a configuration of a shock-absorbing packing material constituting a shock-absorbing packing box in accordance with a second embodiment of the present disclosure.
Figure 7:
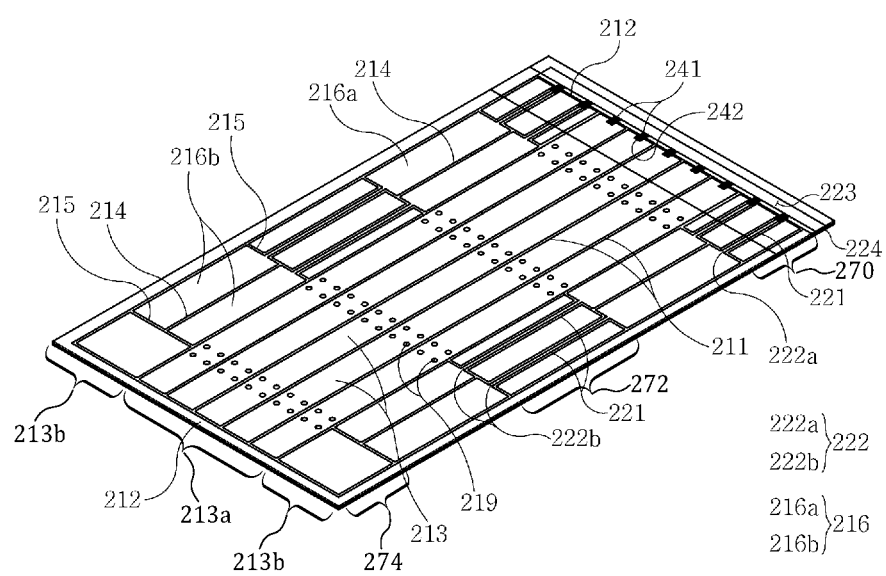
FIG. 7 is a development view illustrating the shock-absorbing packing material constituting the shock-absorbing packing box in accordance with the second embodiment of the present disclosure.
Figure 8:
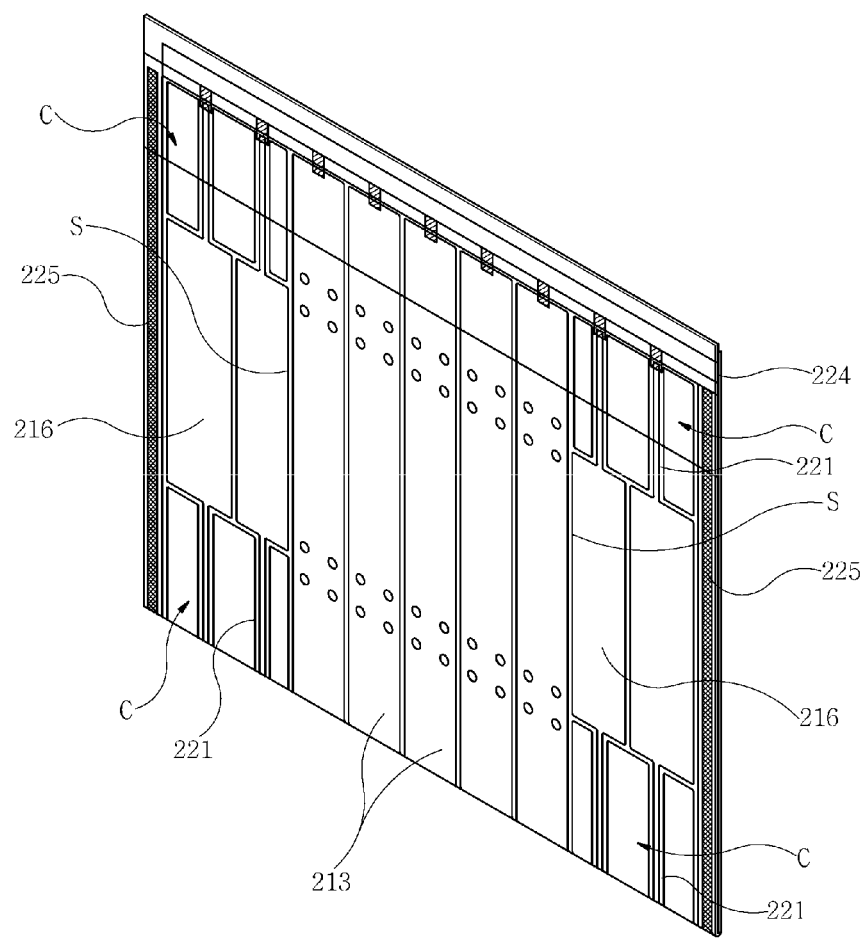
FIGS. 8 and 9 are views illustrating processes of forming the shock-absorbing packing box through the shock-absorbing packing material developed in the second embodiment of the present disclosure.
Figure 9:
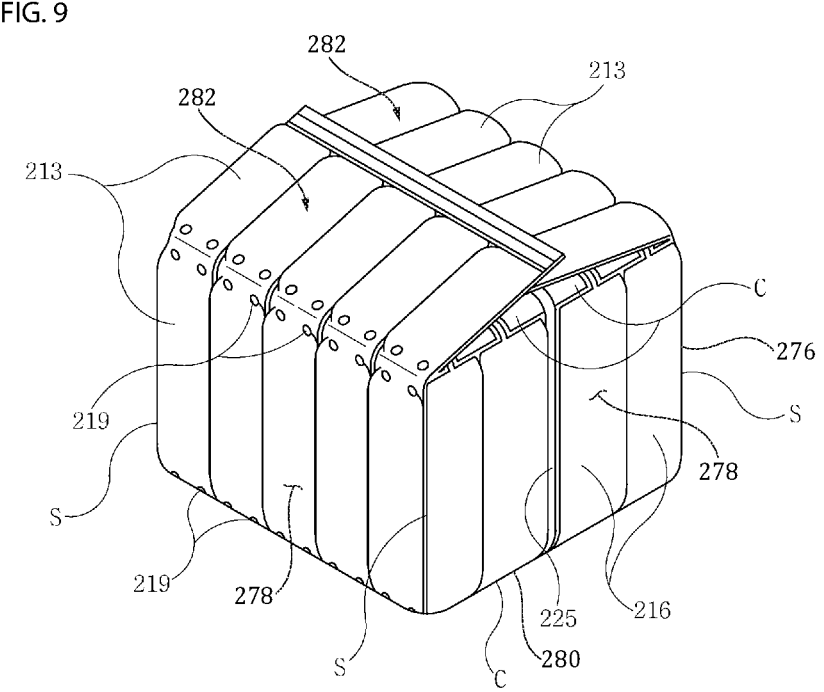

FIG. 6 is an exploded perspective view illustrating a configuration of a shock-absorbing packing material which when folded constitutes a shock-absorbing packing box shown in accordance with a second embodiment of the present disclosure. FIG. 7 is a development view illustrating the shock-absorbing packing material in accordance with the second embodiment of the present disclosure. FIGS. 8 and 9 are views illustrating processes of forming the shock-absorbing packing material developed in the second embodiment of the present disclosure.

As illustrated in FIG. 9, the shock-absorbing packing box in accordance with the second embodiment of the present disclosure is formed from the shock-absorbing packing material of FIGS. 6-8. The shock-absorbing packing material includes an upper outer shell 210 and a lower outer shell 220 which are partially fused to each other to form a plurality of first air cells 213 extending in a lengthwise direction, i.e., a longitudinal direction of the outer shells at a central portion 213a of the outer shells, to form a plurality of second air cells 216 spaced apart from each other by a certain distance in the lengthwise direction of the outer shells at both sides 213b of the central portion 213a of the outer shells 210 and 220, and to form an air injection path 223 configured to inject air into the first and second air cells 213 and 216 at a front end of the outer shells; and an upper inner shell 230 and a lower inner shell 240 which are interposed between the upper outer shell 210 and the lower outer shell 220 and are partially fused to each other to form air inflow paths 242 configured to allow the first and second air cells 213 and 216 and the air injection path 223 to communicate with each other. In a state in which the shock-absorbing packing material is folded in a shape in which a front end and a rear end thereof come into contact with each other as shown in FIG. 8, both side edges of the folded shock-absorbing packing material are fused to each other, and then, air is injected through the air injection path 223 to form a front surface 276, a rear surface 278, a bottom surface 280, and upper covers 282 of a box, and concurrently, both side walls 284 of the box are formed through the plurality of second air cells 216, thereby forming the box shape of FIG. 9.

That is, in the packaging material to form a shock-absorbing packing box in accordance with the second embodiment of the present disclosure as configured above, a pair of inner shells (upper inner shell and lower inner shell) are partially fused between a pair of outer shells (upper outer shell and lower outer shell) to form a shock-absorbing packing material having a plurality of separate air cells, which extend in a longitudinal direction of the outer shells. When air is filled into the separate air cells, the separate air cells filled with the air provide a packing means to be used to form a stable box-shaped structure, and concurrently, maintaining shock-absorbing performance because even when any one air cell of the air cells constituting the packing box bursts, the burst air cell does not affect other air cells.

First, each element of the shock-absorbing packing material constituting a development or unfolded view of the shock-absorbing packing box in accordance with the second embodiment of the present disclosure as configured above will be described in detail with reference to FIGS. 6 and 7.

As illustrated in FIG. 6, the upper outer shell 210 and the lower outer shell 220 are composed of a film made of a synthetic resin or the like and have the same size.

In addition, the upper inner shell 230 and the lower inner shell 240 are also composed of a film made of a synthetic resin or the like and are formed to have the same length as the upper outer shell 210 and the lower outer shell and 220 in the transverse direction and to have a shorter length than the upper outer shell 210 and the lower outer shell 220 in the longitudinal direction.

In addition, backing members 241 are formed along a front edge of the lower inner shell 240. The backing members 241 function to prevent the lower inner shell 240 and the upper inner shell 230 from being fused to each other when the upper inner shell 230 and the lower inner shell 240 are fused.

In such a configuration, the upper inner shell 230 is disposed on the lower inner shell 240 so as to overlap the lower inner shell 240. Then, the overlapped upper and lower inner shells 230 and 240 are disposed below the upper outer shells 210. The upper outer shell 210 and the upper and lower inner shells 230 and 240 are partially fused to form an inner fused portion 231 and to fuse the upper outer shell 210 and the upper and lower inner shells 230 and 240 to each other. In this case, the air inflow paths 242 communicating with the air injection path 223 are formed at portions of the inner fused portion 231, where the backing members 241 are formed.

After that, the upper and lower outer shells 210 and 220 and the upper and lower inner shells 230 and 240 are partially fused in the longitudinal direction and the transverse direction to form a plurality of air cells and the air injection path 223 communicating with an air cell at a front end of the plurality of air cells, thereby forming the shock-absorbing packing material which constitutes the development or unfolded view of the shock-absorbing packing box in accordance with the present embodiment.

That is, specifically describing such a process, as illustrated in FIGS. 6 and 7, the upper and lower outer shells 210 and 220 and the upper and lower inner shells 230 and 240 are concurrently fused to form longitudinal fused portions 211 at certain intervals at a central portion 213a of the outer shells, and to respectively form transverse fused portions 212 at a front end and a rear end of the longitudinal fused portions 211, thereby forming the plurality of first air cells 213 which extend in the longitudinal direction at the central portion 213a of the outer shells.

At the same time, the plurality of second air cells 216 are formed at both sides 213b of the upper and lower outer shells constituting the both side walls 284 of the shock-absorbing packing box so as to be spaced apart from each other by a certain distance in the longitudinal direction of the outer shells. Auxiliary longitudinal fused portions 214 and auxiliary transverse fused portion 215 configured to finish front and rear ends of the auxiliary longitudinal fused portions 214 are formed between an upper end 270 and a middle portion 272 of the outer shells in the longitudinal direction of the outer shells to form a plurality of second air cells 216a. In addition, auxiliary longitudinal fused portions 214 and auxiliary transverse fused portion 215 are also formed between a lower end 274 and the middle portion 272 of the outer shells to form a plurality of second air cells 216b.

In this case, ends of both side edges 213a of the upper and lower outer shells 210 and 220 are finished by side fused portions 217, respectively.

In addition, path fused portions 221 in the longitudinal direction are formed at upper ends 270 and middle portions 272 of both sides of the outer shells 213b to form air injection guide paths 222 configured to inject air into the second air cells 216.

In this case, the air injection guide paths 222 include air injection guide paths 222a formed at upper ends 270 of both sides of the outer shells 213b and air injection guide paths 222b formed at middle portions 272 of both sides 213b of the outer shells. Here, the air injection guide paths 222a formed at upper ends 270 of both sides 213a of the outer shells allow the plurality of second air cells 216a formed between the upper end 270 and the middle portion 272 of both sides 213b of the outer shells, and the air inflow paths 242 formed in the upper and lower inner shells 230 and 240 to communicate with each other. The air injection guide paths 222b formed at the middle portions 272 of both sides 213b of the outer shells allow the plurality of second air cells 216a formed between the upper end 270 and the middle portion 272 of both sides of the outer shells, and the plurality of second air cells 216b formed between the middle portion 272 and the lower end 274 of both sides of the outer shells to communicate with each other.

Furthermore, a front fused portion 218 is formed at a front end of the transverse fused portion 212 fused to the front end of the first air cells 213 along an upper edge of the upper end lower outer shells 210 and 220. The front fused portion 218 forms the air injection path 223 together with the transverse fused portion 212 fused to the front end of the first air cells 213.

In this case, an opened air injection port 224, through which air is injected, is formed at an end of the air injection path 223, and an end of the air injection path 223, which is opposite to the air injection port 224, is closed.

Point fused portions 219 configured to fuse the upper outer shell 210 and the lower outer shell 220 are formed on the plurality of first air cells 213 of the shock-absorbing packing material as configured above in the transverse direction. Thus, the plurality of first air cells 213 may be folded through the point fused portions 219 even in a state of being filled with air.

That is, in a process of folding the shock-absorbing packing material into a box shape, a plurality of the point fused portions 219 as formed above may be formed on the first air cells 213 such that the first air cells 213 are folded to form a front surface 276, a rear surface 278, a bottom surface 280, and upper covers 282 of a box.

The shock-absorbing packing material having the above-described configuration is configured as follows. When air is injected through the air injection port 224, the air injected into the air injection path 223 is injected into the plurality of first air cells 213 through the air inflow paths 242, and concurrently, the air injected into the air injection path 223 is injected into the plurality of second air cells 216a formed between the upper end 270 and the middle portion 272 of both sides 213b of the outer shells through the air inflow paths 242 and the air injection guide paths 222a formed at the upper ends 270 of both sides 213a of the outer shells. In addition, the air injected into the second air cells 216a is injected into the second air cells 216b formed between the middle portion 272 and the lower end 274 of both sides 213b of the outer shells through the air injection guide paths 222b formed at the middle portions 272 of both sides 213b of the outer shells.

In this case, since the plurality of first air cells 213 formed in the shock-absorbing packing material are each formed as a separate air cell formed in the longitudinal direction, when any one first air cell 213 bursts, the burst first air cell 213 may not affect other fair cells. When any one second air cells 216a of the plurality of second air cells 216a and 216b bursts, the burst air cell 216a may not affect other air cells except for a second air cell 216b connected to the burst second air cell 216a through the air injection guide path 222.

Meanwhile, the shock-absorbing packing material as formed above is folded into a box shape to form the shock-absorbing packing box in accordance with the second embodiment of the present disclosure as shown in FIG. 9. Such a process of forming the box is as follows.

First, as illustrated in FIG. 8, in a state in which the developed shock-absorbing packing material is folded in a shape in which the front end 270 and the rear end 274 thereof come into contact with each other, both side edges of the folded shock-absorbing packing material are fused to each other to form side fused portions 225. In this case, the front end 270 and the rear end 274 in contact with each other maintain a separated state.

After that, as illustrated in FIGS. 8 and 9, after air is injected through the air injection port 224 formed in the upper and lower outer shells 210 and 220 (see FIG. 6) and then is filled into the plurality of first air cells 213 and the plurality of second air cells 216, the shock-absorbing packing material is folded along the transverse fused portions 219 formed on the second air cells 213 in the transverse direction to form the front surface 276, the rear surface 278, the bottom surface 280, and the pair of upper covers 282 of the shock-absorbing packing box through the plurality of first air cells 213. In addition, the shock-absorbing packing material is folded along longitudinal fused portions S between the first air cells 213 and the second air cells 216, and concurrently, side edges of the shock-absorbing packing material, which are fused by the side fused portions 225, are unfold to form the both side walls 284 of the shock-absorbing packing box through the plurality of second air cells 216. In this case, except for the first and second air cells 121 and 122 in the folded shock-absorbing packing material, corners C of the outer shells, which are not injected with air and in which the path fused portions 221 are formed, are tucked into the box to form the shock-absorbing packing box having an overall rectangular shape as illustrated in FIG. 9.

Here, the pair of covers formed on an upper portion of the shock-absorbing packing box may be configured such that opposite ends of the covers overlap each other or the covers entirely overlap each other to cover the opened upper portion of the shock-absorbing packing box.

In the shock-absorbing packing box in accordance with the present embodiment having the above-described configuration, the shock-absorbing packing material having a plurality of separate air cell structures extending in the longitudinal direction may be formed into a box shape to form the shock-absorbing packing box, thereby providing a packing means having a stable structure with a box shape and concurrently maintaining a shock-absorbing function because even when any one air cell in the packing box bursts, the burst air cell does not affect other air cells.

Meanwhile, the shock-absorbing packing boxes having the plurality of air cell structures in accordance with the first and second embodiments as described above, when a packing material constituting a development view is formed, an auxiliary inner shell is additionally provided between an upper outer shell and a lower outer shell forming air cells, and thus, the shock-absorbing packing box may be formed by using the shock-absorbing packing material having a plurality of air cells with a multi-layered structure. In this case, when an article is packed, the article may be more safely protected by improving impact resistance through the air cells with the multi-layered structure. In addition, the shock-absorbing packing box may be usefully used to pack an article needing to be kept warm or cold by blocking a heat transfer between the inside and the outside of the packing material through the air cells with the multi-layered structure.

Figure 10:
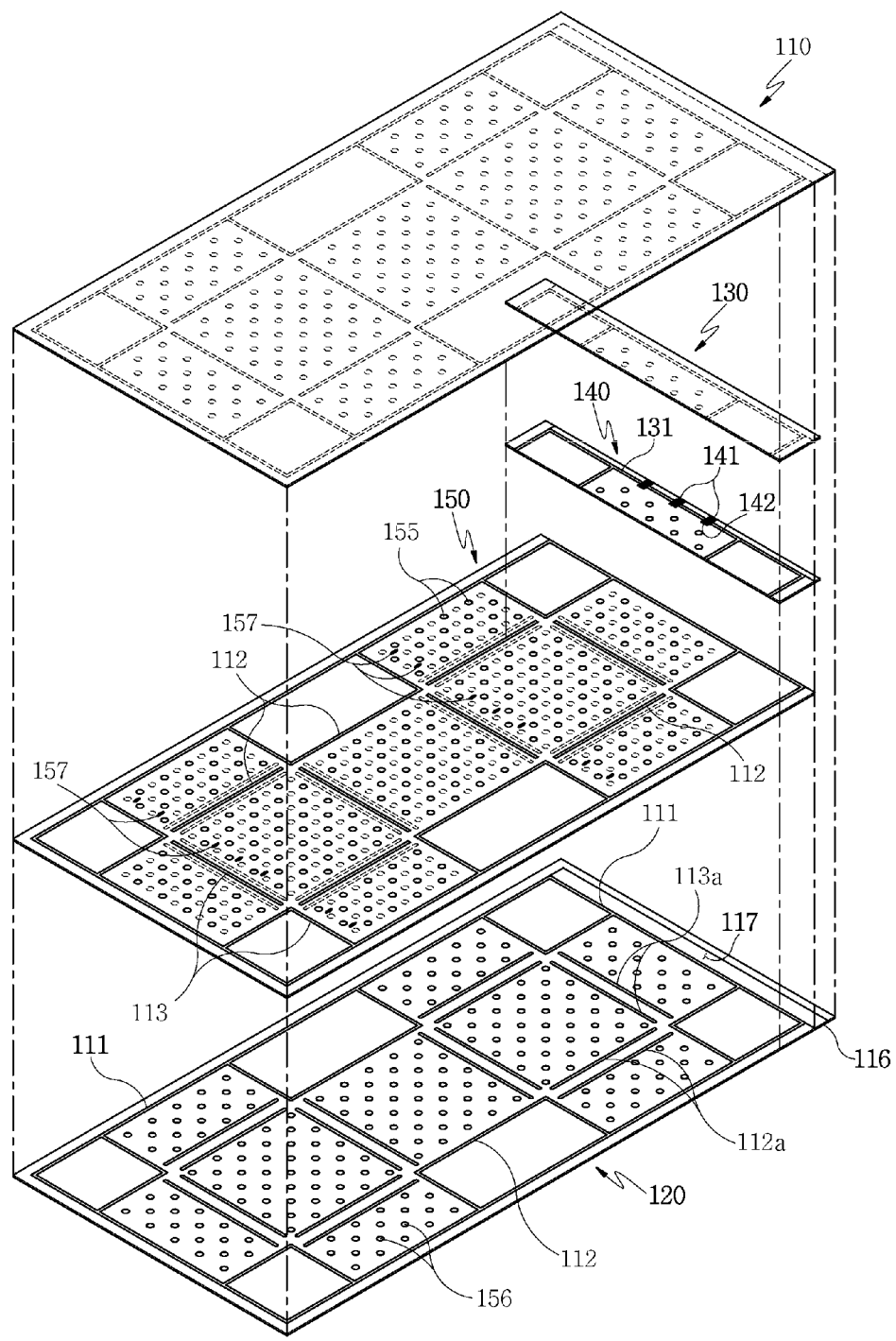
FIG. 10 is an exploded perspective view illustrating a configuration of a shock-absorbing packing material formed by additionally providing an auxiliary inner shell to the first embodiment of the present disclosure.
Figure 11:
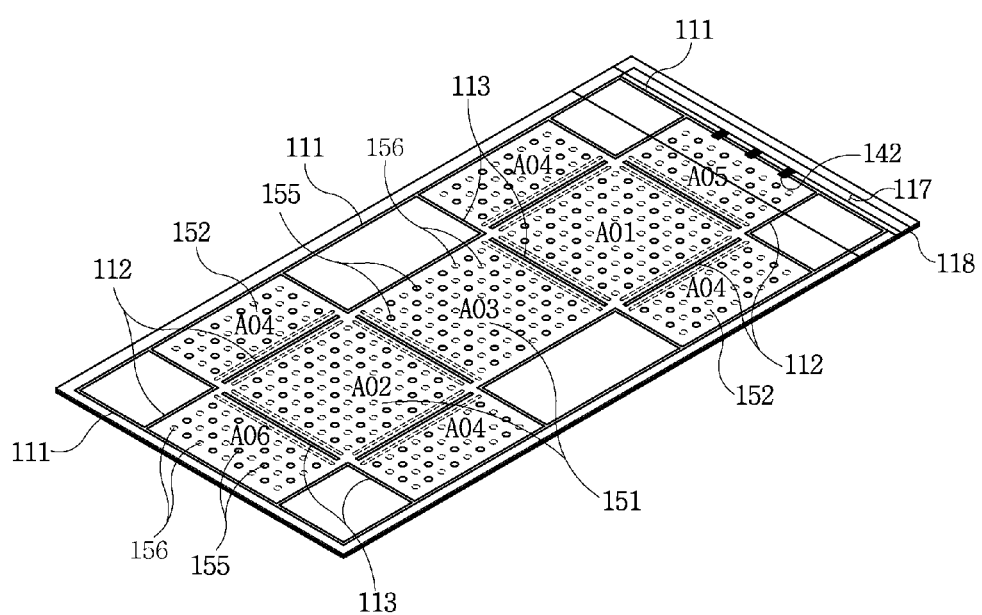
FIG. 11 is a development view illustrating the shock-absorbing packing material formed by additionally providing the auxiliary inner shell to the first embodiment of the present disclosure.
Figure 12:
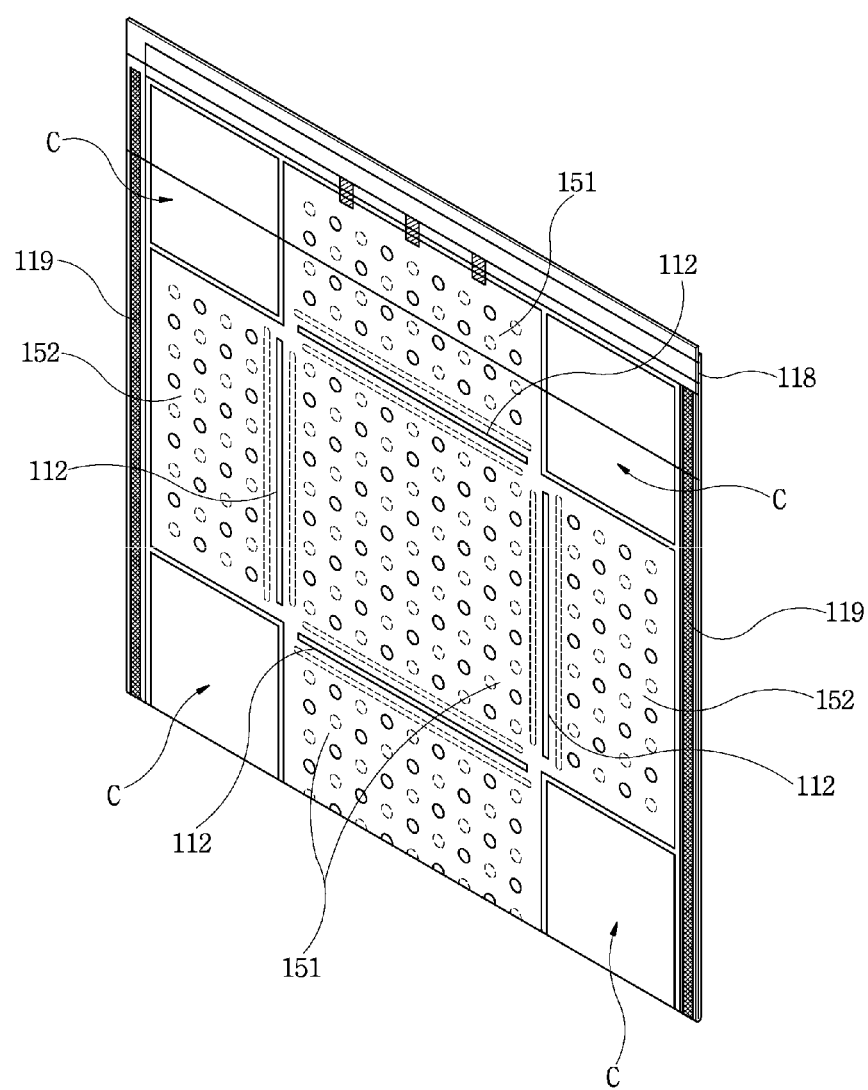
FIGS. 12 and 13 are views illustrating processes of forming a shock-absorbing packing box through the shock-absorbing packing material formed by additionally providing the auxiliary inner shell to the first embodiment of the present disclosure.
Figure 13:
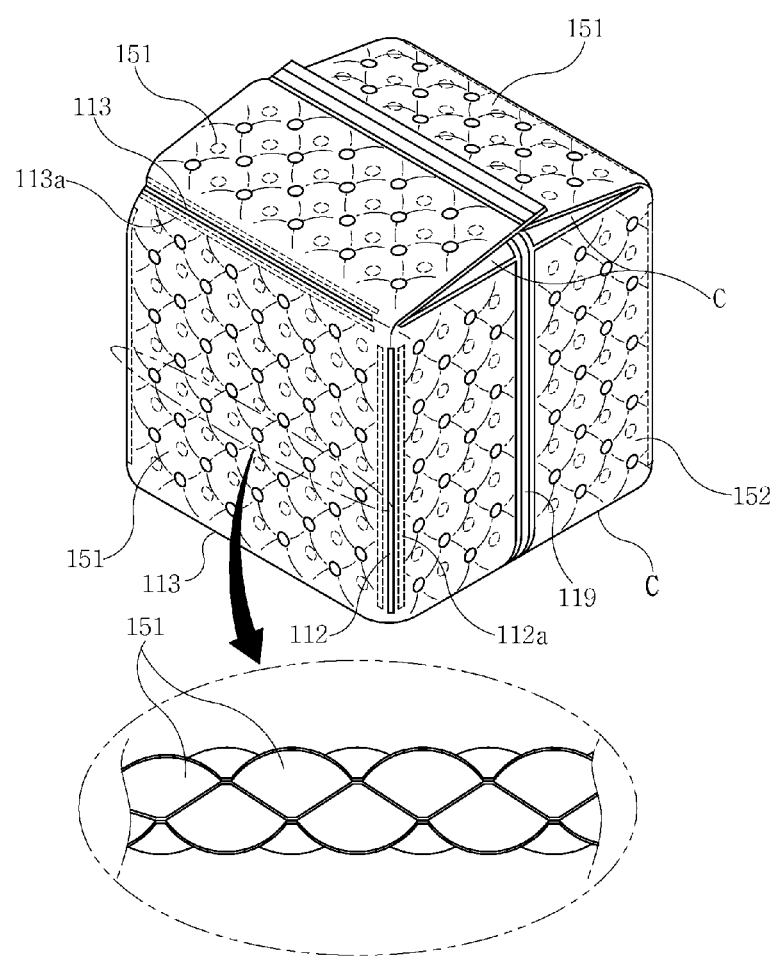

FIG. 10 is an exploded perspective view illustrating a configuration of a shock-absorbing packing material formed by additionally providing an auxiliary inner shell to the first embodiment of the present disclosure. FIG. 11 is a development view illustrating the shock-absorbing packing material formed by additionally providing the auxiliary inner shell to the first embodiment of the present disclosure. FIGS. 12 and 13 are views illustrating processes of forming a shock-absorbing packing box through the shock-absorbing packing material formed by additionally providing the auxiliary inner shell to the first embodiment of the present disclosure.

That is, as described above, a shock-absorbing packing material constituting a development view of the shock-absorbing packing box in accordance with the first embodiment of the present disclosure may be configured to include an upper outer shell 110, a lower outer shell 120, an upper inner shell 130, and a lower inner shell 140. An auxiliary inner shell 150 alternately and partially fused with each of the upper outer shell 110 and the lower outer shell 120 may be additionally provided between the upper outer shell 110 and the lower outer shell 120 forming air cells, so that the air cells formed between the upper outer shell 110 and the lower outer shell 120 may be formed to have a multi-layered structure.

Since the shock-absorbing packing box as configured above further has one layer of air cells, the shock-absorbing packing box may have relatively excellent shock-absorbing and thermal insulation effects as compared with the shock-absorbing packing box having the above-described single-layered air cell structure.

Hereinafter, each element of the shock-absorbing packing material constituting a development view of the shock-absorbing packing box in accordance with the present embodiment will be described in detail with reference to FIGS. 10 and 11.

The auxiliary inner shell 150 may be an inner shell provided to form a plurality of air cells formed in a two-layered structure in the upper outer shell 110 and the lower outer shell 120. The auxiliary inner shell 150 may be composed of a film made of the same synthetic resin or the like as the upper outer shell 110 and the lower outer shell and 120.

Here, the auxiliary inner shell 150 may be formed to have the same length as the upper outer shell 110 and the lower outer shell 120 in a transverse direction thereof and to have a shorter length than the upper outer shell 110 and the lower outer shell 120 in a longitudinal direction thereof.

When the shock-absorbing packing material is formed to include the auxiliary inner shell 150, as illustrated in FIG. 10, the auxiliary inner shell 150 is stacked on an upper portion of the lower outer shell 120, the overlapped upper and low inner shells 130 and 140 are stacked on an upper portion of the auxiliary inner shell 150, and then, the upper outer shell 110 is stacked thereon to partially fuse the sequentially stacked lower outer shell 120, auxiliary inner shell 150, overlapped upper and low inner shells 130 and 140, and upper outer shell 110.

In this case, in such a fusion process, first, the upper outer shell 110, the upper inner shell 130, and the lower inner shell 140 are partially fused at certain intervals in the longitudinal direction to form an inner fused portion 131, to fuse the upper outer shell 110 and the upper inner shell 130 to each other, and concurrently, to form a plurality of air inflow paths 142 between the upper inner shell 130 and the lower inner shell 140.

After that, as illustrated in FIGS. 10 and 11, the auxiliary inner shell 150 is interposed and partially fused between the upper outer shell 110 and the lower outer shell 120 to which the upper and lower inner shells 130 and 140 are fused, thereby forming a plurality of air cells in a two-layered structure at a central portion of the outer shells constituting a front surface A01, a rear surface A02, a bottom surface A03, and upper covers of the shock-absorbing packing box through the auxiliary inner shell 150 interposed between the upper outer shell 110 and the lower outer shell 120, and forming a plurality of second air cells 152 in a two-layered structure at each of both sides of the outer shells constituting both side walls A04 of the shock-absorbing packing box.

That is, specifically, as illustrated in FIGS. 10 and 11, the auxiliary inner shell 150 is partially fused between the upper outer shell 110 and the lower outer shell 120, thereby forming an edge fused portion 111 along an edge of the outer shells, and concurrently, forming a plurality of longitudinal fused portions 112 and a plurality of transverse fused portions 113 dividing the front surface A01, the rear surface A02, the bottom surface A03, the both side walls A04, and a pair of upper covers A05 and A06 constituting the shock-absorbing packing box on the outer shells.

In addition, a plurality of first point fused portions 155 configured to fuse the upper outer shell 110 and the auxiliary inner shell 150 to each other in a certain pattern are formed on the front surface A01, the rear surface A02, the bottom surface A03, the both side walls A04, and the pair of upper covers A05 and A06. At the same time, a plurality of second point fused portions 156 configured to fuse the auxiliary inner shell 150 and the lower outer shell 120 are formed in an alternate pattern with the plurality of first point fused portions 155. Thus, A plurality of first air cells 151, which constitute the front surface A01, the rear surface A02, the bottom surface A03, and the pair of upper covers A05 and A06 of the shock-absorbing packing box are formed in a two-layered structure with an embossed shape at the central portion of the outer shells in a lengthwise direction of the outer shells. A plurality of second air cells 152, which are spaced apart from each other by a certain distance, are formed in a two-layered structure with an embossed shape at each of both sides of the outer shells in the lengthwise direction of the outer shells, thereby constituting the both side walls A04 of the shock-absorbing packing box through the second air cells 152 formed in the two-layered structure.

In addition, the plurality of longitudinal fused portions 112 and the plurality of the transverse fused portions 113, which divide the front surface, the rear surface, the bottom surface, the both side walls, and the pair of upper covers constituting the shock-absorbing packing box on the outer shells, function as folding lines such that the plurality of first air cells 151 and the plurality of second air cells 152 are folded into a box shape in a state of being filled with air. Since the first air cells 151 and the second air cells 152 are each formed in the two-layered structure, as illustrated in FIGS. 10 and 13, longitudinal fused portions 112a and transverse fused portions 113a on the lower outer shell 120, which are folded inside a box among the plurality of longitudinal fused portions 112 and the plurality of the transverse fused portions 113 forming the folding lines, may each be formed as a pair of fused portions spaced apart from each other such that the first air cells 151 and the second air cells 152 each formed in the two-layered structure are easily folded into a box shape.

In addition, in the shock-absorbing packing material as configured above, since air inflow paths 142 communicating with an air injection path 117 are formed in the upper and lower inner shells 130 and 140 fused to the upper outer shell 110 and communicate only with a plurality of first air cells 151 and a plurality of second air cells 152 formed in an upper layer of the first and second air cells 151 and 152 formed in the two-layered structure, as illustrated in FIGS. 10 and 11, at least one air flow hole 157 may be formed in the auxiliary inner shell 150 between the air cells in the upper layer and the air cells in a lower layer such that air introduced into the first and second air cells 151 and 152 in the upper layer through the air inflow paths 142 is introduced into the first and second air cells 151 and 152 in the lower layer.

In the shock-absorbing packing material having the above-described configuration, when air is injected through an air injection port 118, the air injected into the air injection path 117 is injected into the first air cell 151 disposed at a front end of the outer shells through the air inflow paths 142, and then, the air injected into the first air cell 151 is injected into other first air cells 151 successively disposed in rear of the first air cell 151 and concurrently is injected into the second air cells 152 communicating with the first air cells 151. Accordingly, air is filled into the plurality of first air cells 151 and the plurality of second air cells 152 formed in the upper layer of the plurality of air cells formed in the two-layered structure and is also filled into the plurality of first air cells 151 and the plurality of second air cells 152 formed in the lower layer through at least one air flow hole 157 formed in the auxiliary inner shell 150.

In this case, in order to secure an effective air flow between the plurality of first air cells 151 and the plurality of second air cells 152 formed in the upper layer and the plurality of first air cells 151 and the plurality of second air cells 152 formed in the lower layer when air is injected, it is preferable that a plurality of air flow holes 157 are provided.

Meanwhile, the shock-absorbing packing material as formed above is folded into a box shape to form a shock-absorbing packing box having air cells formed in a two-layered structure. Such a process of forming the box is as follows.

First, as illustrated FIG. 12, in a state in which the developed shock-absorbing packing material is folded in a shape in which a front end and a rear end thereof come into contact with each other, both side edges of the folded shock-absorbing packing material are fused to each other to form side fused portions 119. In this case, the front end and the rear end in contact with each other maintain a separated state.

After that, as illustrated in FIGS. 12 and 13, after air is injected through the air injection port 118 formed in the upper and lower outer shells 110 and 120 (see FIG. 10) and then is filled into the plurality of first air cells 151 and the plurality of second air cells 152, which are each formed in the two-layered structure, the shock-absorbing packing material is folded along the transverse fused portions 113 dividing the plurality of the first air cells 151 to form the front surface, the rear surface, the bottom surface, and the pair of upper covers of the shock-absorbing packing box through the plurality of first air cells 151 formed in the two-layered structure. In addition, the shock-absorbing packing material is folded along the longitudinal fused portions 112 between the first air cells 151 and the second air cells 152, and concurrently, side edges of the shock-absorbing packing material, which are fused by the side fused portions 119, are unfold to form the both side walls of the shock-absorbing packing box through the plurality of second air cells 152 formed in the two-layered structure. In this case, except for the first and second air cells 151 and 152 in the folded shock-absorbing packing material, corners C of the outer shells, which are not injected with air, are tucked in a box to form the shock-absorbing packing box having an overall rectangular shape as illustrated in FIG. 13.

In accordance with the shock-absorbing packing box as configured above, as illustrated in a cross-sectional view of FIG. 13, since box walls are formed as air cells formed in a two-layered structure with an embossed shape, when an article is packed using the shock-absorbing packing box, the article may be more safely protected by improving impact resistance through the air cells formed in the two-layered structure.

In addition, a heat transfer between the inside and the outside of the packing material through portions where the air cells are connected to each other may be effectively blocked due to a two-layered air cell structure with an embossed shape, so that the shock-absorbing packing box may have an excellent thermal insulation effect when an articles is packed and thus may be usefully used to pack an article needing to be kept warm or cold.

Figure 14:
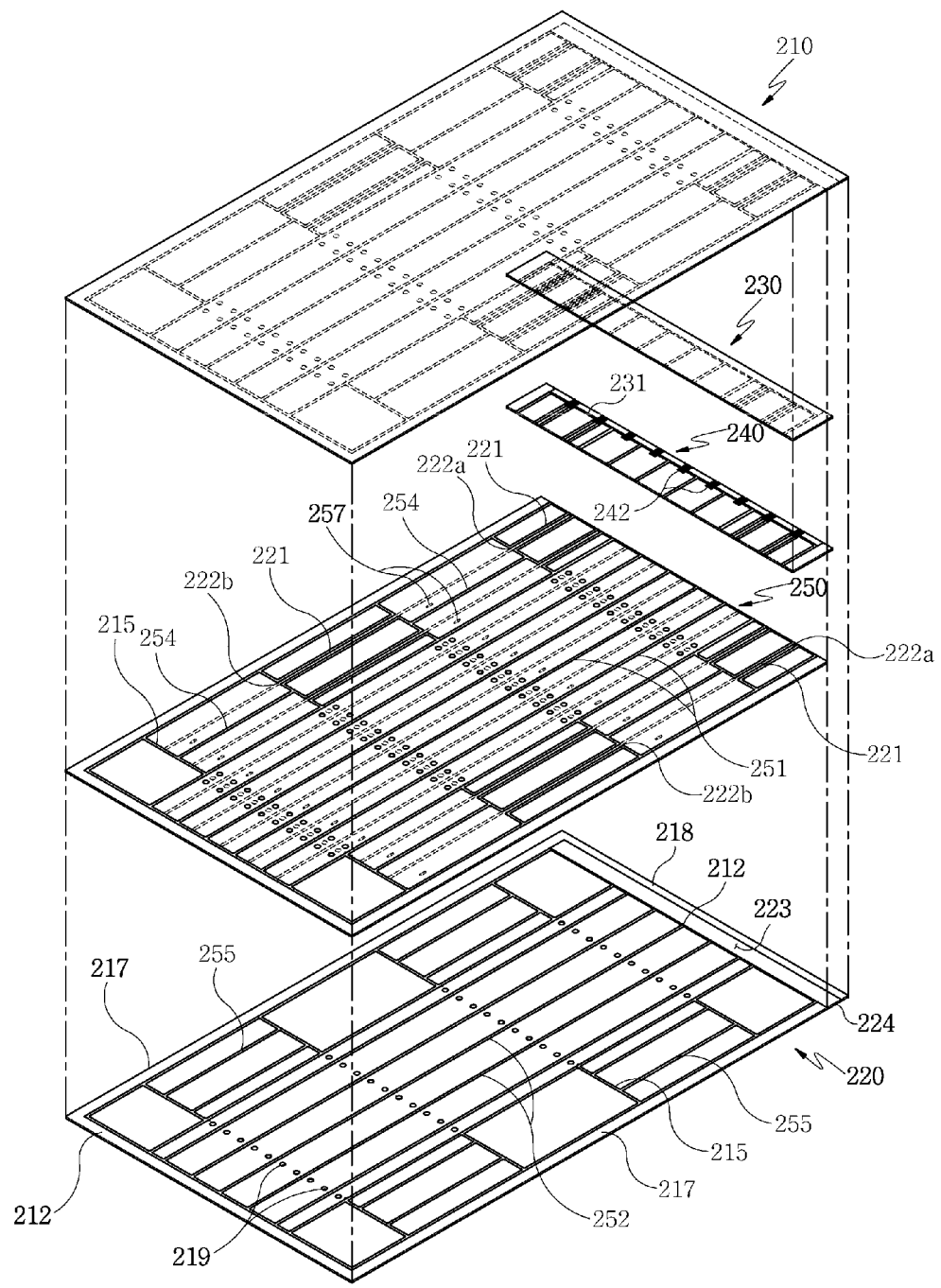
FIG. 14 is an exploded perspective view illustrating a configuration of a shock-absorbing packing material formed by additionally providing an auxiliary inner shell to the second embodiment of the present disclosure.
Figure 15:
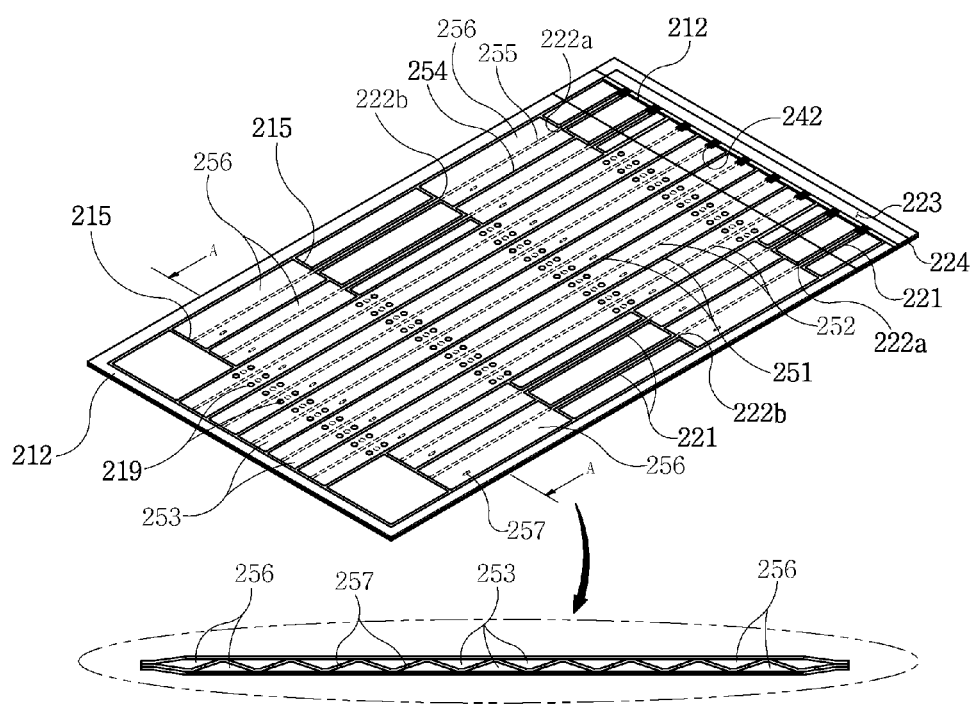
FIG. 15 is a developed view illustrating the shock-absorbing packing material formed by additionally providing the auxiliary inner shell to the second embodiment of the present disclosure.
Figure 16:
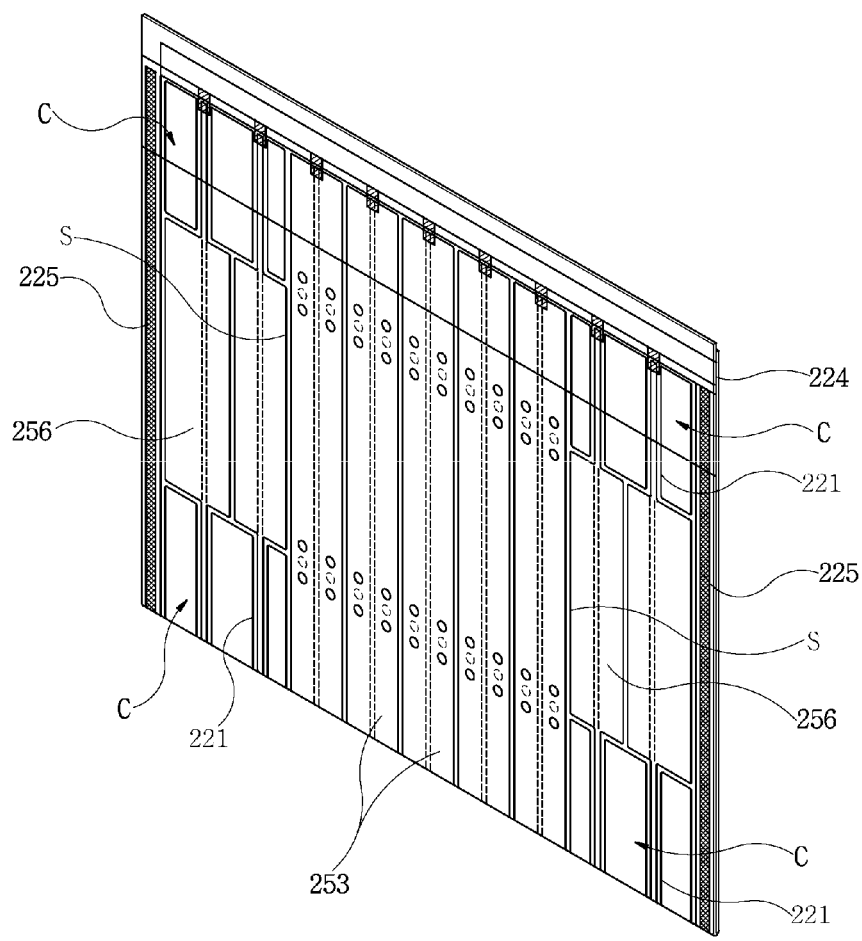
FIGS. 16 and 17 are views illustrating processes of forming a shock-absorbing packing box through the shock-absorbing packing material formed by additionally providing the auxiliary inner shell to the second embodiment of the present disclosure.
Figure 17:
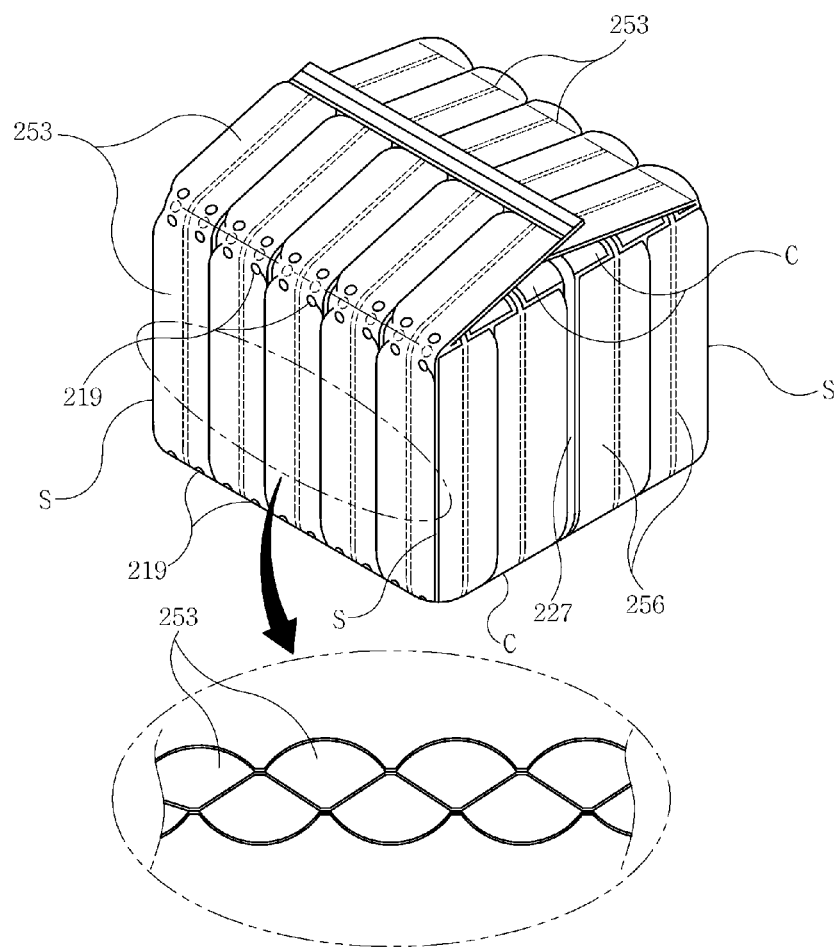

Meanwhile, FIG. 14 is an exploded perspective view illustrating a configuration of a shock-absorbing packing material formed by additionally providing an auxiliary inner shell to the second embodiment of the present disclosure. FIG. 15 is a developed view illustrating the shock-absorbing packing material formed by additionally providing the auxiliary inner shell to the second embodiment of the present disclosure. FIGS. 16 and 17 are views illustrating processes of forming a shock-absorbing packing box through the shock-absorbing packing material formed by additionally providing the auxiliary inner shell to the second embodiment of the present disclosure.

When a shock-absorbing packing material constituting a developed view of the shock-absorbing packing box in accordance with the second embodiment of the present disclosure is formed, an auxiliary inner shell 250 alternately and partially fused with each of an upper outer shell 210 and a lower outer shell 220 may be additionally provided between the upper outer shell 210 and the lower outer shell 220 forming air cells, so that the air cells formed between the upper outer shell 210 and the lower outer shell 220 may be formed to have a multi-layered structure.

Hereinafter, each element of the shock-absorbing packing material constituting a development view of the shock-absorbing packing box in accordance with the present embodiment will be described in detail with reference to FIGS. 14 and 15.

The auxiliary inner shell 250 may be an inner shell provided to form a plurality of air cells formed in a two-layered structure in the upper outer shell 210 and the lower outer shell 220. The auxiliary inner shell 250 may be composed of a film made of the same synthetic resin or the like as the upper outer shell 210 and the lower outer shell and 220.

Here, the auxiliary inner shell 250 may be formed to have the same length as the upper outer shell 210 and the lower outer shell 220 in a transverse direction thereof and to have a shorter length than the upper outer shell 210 and the lower outer shell 220 in a longitudinal direction thereof.

When the shock-absorbing packing material is formed to include the auxiliary inner shell 250, as illustrated in FIG. 14, the auxiliary inner shell 250 is stacked on an upper portion of the lower outer shell 220, overlapped upper and low inner shells 230 and 240 are stacked on an upper portion of the auxiliary inner shell 250, and then, the upper outer shell 210 is stacked thereon to partially fuse the sequentially stacked lower outer shell 220, auxiliary inner shell 250, overlapped upper and low inner shells 230 and 240, and upper outer shell 210.

In this case, in such a fusion process, first, the upper outer shell 210, the upper inner shell 230, and the lower inner shell 240 are partially fused at certain intervals in the longitudinal direction to form an inner fused portion 231, to fuse the upper outer shell 210 and the upper inner shell 230 to each other, and concurrently, to form a plurality of air inflow paths 242 between the upper inner shell 230 and the lower inner shell 240.

After that, as illustrated in FIGS. 14 and 15, the auxiliary inner shell 250 is interposed and partially fused between the upper outer shell 210 and the lower outer shell 220 to which the upper and lower inner shells 230 and 240 are fused, thereby forming a plurality of air cells 253 in a two-layered structure at a central portion of the outer shells constituting a front surface, a rear surface, a bottom surface, and upper covers of the shock-absorbing packing box through the auxiliary inner shell 250 interposed between the upper outer shell 210 and the lower outer shell 220, and forming a plurality of second air cells 256 in a two-layered structure at each of both sides of the outer shells constituting both side walls of the shock-absorbing packing box.

That is, specifically, as illustrated in FIGS. 14 and 15, the auxiliary inner shell 250 is partially fused between the upper outer shell 210 and the lower outer shell 220 to form first longitudinal fused portions 251 configured to fuse the upper outer shell 210 and the auxiliary inner shell 250 at certain intervals at a central portion of the outer shells, and concurrently, to form second longitudinal fused portions 252 configured to fuse the auxiliary inner shell 250 and the lower outer shell 220 at certain internals so as to be alternate with the first longitudinal fused portions 251. Transverse fused portions 212 are respectively formed at a front end and a rear end of the first and second longitudinal fused portions 251 and 252, which are formed alternately with each other, thereby the plurality of first air cells 253 in the two-layered structure in which an upper layer and a lower layer are alternately stacked at the central portion of the outer shells.

At the same time, both sides of the upper and lower outer shells 210 and 220 are partially fused with the auxiliary inner shell 250 to form first auxiliary fused portions 254 between an upper end and a middle portion of both sides of the outer shells and between the middle portion and a lower end of both sides of the outer shells, and concurrently, to form second auxiliary longitudinal fused portions 255 configured to fuse the auxiliary inner shell 250 and the lower outer shell 220 so as to be alternate with the first auxiliary longitudinal fused portions 254. Auxiliary transverse fused portions 215 are respectively formed at a front end and a rear end of the first and second auxiliary longitudinal fused portions 254 and 255, which are formed alternately with each other, thereby forming a plurality of second air cells 256a and 256b having in a two-layered structure in which an upper layer and a lower layer are alternately stacked at each of both sides of the outer shells.

In this case, ends of both side edges of the upper outer shell 210, the auxiliary inner shell 250, and the lower outer shell 220 are finished by side fused portions 217, respectively.

In addition, path fused portions 221 are formed at upper ends and middle portions of both sides of the outer shells to form air injection guide paths 222a and 222b configured to inject air into the second air cells 216.

In addition, in the shock-absorbing packing material as configured above, since air inflow paths 242 communicating with an air injection path 223 are formed in the upper and lower inner shells 230 and 240 fused to the upper outer shell 210 and communicate only with a plurality of first air cells 253 and a plurality of second air cells 256 formed in an upper layer of the plurality of air cells formed in the two-layered structure, which are alternately stacked, as illustrated in FIGS. 14 and 15, a plurality of air flow holes 257 may be formed in the auxiliary inner shell 250 between the air cells in the upper layer and the air cells in a lower layer such that air introduced into the first and second air cells 253 and 256 in the upper layer through the air inflow paths 242 is introduced into the first and second air cells 253 and 256 in the lower layer.

In this case, since the plurality of air flow holes 257 are formed such that a pair of first air cells 253 disposed in the upper layer communicate with a pair of first air cells 253 in the lower layer among the plurality of air cells formed in the two-layered structure and are also formed such that a pair of second air cells 256 disposed in the upper layer communicate with a pair of second air cells 256, even when any one air cell bursts in the shock-absorbing packing material, the burst air cell does not affect other air cells except for an air cell paired with and connected to the burst air cell through the air flow hole 257. In addition, point fused portions 219 configured to fuse the upper outer shell 210, the auxiliary inner shell 250, and the lower outer shell 220 are formed on the plurality of first air cells 253 of the shock-absorbing packing material configured above in the transverse direction. Thus, the plurality of first air cells 253 may be folded through the point fused portions 219 even in a state of being filled with air.

In the shock-absorbing packing material having the above-described configuration, when air is injected through an air injection port 224, the air injected into the air injection path 223 is injected into the plurality of first air cells 253 through the air inflow paths 242, and concurrently, the air injected into the air injection path 223 is injected into the plurality of second air cells 256 through the air inflow paths 242 and the air injection guide paths 222a and 222b. Thus, among the plurality of air cells formed in the two-layered structure, the air is filled into the plurality of first air cells 253 and the plurality of second air cells 256 formed in the upper layer and is also filled into the plurality of first air cells 253 and the plurality of second air cells 256 formed in the lower layer though the plurality of the air flow holes 257.

Meanwhile, the shock-absorbing packing material as formed above is folded into a box shape to form a shock-absorbing packing box having air cells with a two-layered structure. Such a process of forming the box is as follows.

First, as illustrated in FIG. 16, in a state in which the developed shock-absorbing packing material is folded in a shape in which a front end and a rear end thereof come into contact with each other, both side edges of the folded shock-absorbing packing material are fused to each other to form side fused portions 225. In this case, the front end and the rear end in contact with each other maintain a separated state.

After that, as illustrated in FIGS. 16 and 17, after air is injected through the air injection port 224 formed in the upper and lower outer shells 210 and 220 (see FIG. 14) and then is filled into the plurality of first air cells 253 and the plurality of second air cells 256 formed in the two-layered structure, the shock-absorbing packing material is folded along the point fused portions 219 formed on the first air cells 253 in the transverse direction to form the front surface, the rear surface, the bottom surface, and the pair of upper covers of the shock-absorbing packing box through the plurality of first air cells 253 formed in the two-layered structure. In addition, the shock-absorbing packing material is folded along longitudinal fused portions S between the first air cells 253 and the second air cells 256, and concurrently, side edges of the shock-absorbing packing material, which are fused by the side fused portions 225, are unfold to form the both side walls of the shock-absorbing packing box through the plurality of second air cells 256 formed in the two-layered structure. In this case, except for the first and second air cells 253 and 256 in the folded shock-absorbing packing material, corners C of the outer shells, which are not injected with air and in which the path fused portions 221 are formed, are tucked in a box to form the shock-absorbing packing box having an overall rectangular shape as illustrated in FIG. 17.

In accordance with the shock-absorbing packing box as configured above, as illustrated in a cross-sectional view of FIG. 17, since box walls are formed as a plurality of air cells formed in a two-layered structure, when an article is packed using the shock-absorbing packing box, the article may be more safely protected by improving impact resistance through the air cells formed in the two-layered structure.

In addition, a heat transfer between the inside and the outside of the packing material through portions where the air cells are connected to each other may be effectively blocked due to the air cells formed in the two-layered structure, which are alternately stacked, so that the shock-absorbing packing box may have an excellent thermal insulation effect when an article is packed and thus may be usefully used to pack an article needing to be kept warm or cold.

Meanwhile, while an example in which a shock-absorbing packing box is formed using a shock-absorbing packing material having a two-layered air cell structure by adding the auxiliary inner shell described above has been described, it is also possible to form a shock-absorbing packing material having a multi-layered air cell structure with at least three layers by providing at least two auxiliary inner layers constituting a shock-absorbing material and to form a shock-absorbing packing box having a multi-layered air cell structure by using the shock-absorbing packing material.

As described above, in accordance with the shock-absorbing packing box in accordance with the present disclosure, a shock-absorbing packing material having a plurality of air cell structures may be formed into a box shape to form the shock-absorbing packing box, thereby providing a packing means having a stable structure with a box shape and concurrently more safely protecting an article accommodated in a box through the plurality of air cell structures.

Furthermore, in a case in which a shock-absorbing packing box is formed using a shock-absorbing packing material having a plurality of air cells formed in a multi-layered structure, when an article is packed, the article may be more safely protected by improving impact resistance through the air cells formed in the multi-layered structure. In particular, a heat transfer between the inside and the outside of the packing material through portions where the air cells are connected to each other may be effectively blocked due to air cells formed in the two-layered structure, which are alternately stacked, so that the shock-absorbing packing box may have an excellent thermal insulation effect when an article is packed and thus may be usefully used to pack an article needing to be kept warm or cold. The present disclosure may be variously substituted or modified without departing from the technical concept of the present disclosure by persons having ordinary skills of the technical field to which the present disclosure belongs, and therefore, is not limited to the above-described examples and the attached drawings.

INDUSTRIAL AVAILABILITY

In accordance with a shock-absorbing packing box in accordance with the present disclosure, since a shock-absorbing packing material having a plurality of air cell structures is formed into a box shape to form the shock-absorbing packing box, it is possible to provide a packing means having a stable structure with a box shape and concurrently improve shock-absorbing performance and thermal insulation performance, so that the shock-absorbing packing box may be usefully used to safely pack and protect an article therein when the article is transferred, or to pack an article needing to be kept warm or cold.

The invention claimed is:

1. A shock-absorbing packing box formed by folding shock-absorbing packaging material, comprising:
   a shock-absorbing packing material comprising a plurality of air cells,
   wherein the shock-absorbing packing material comprises an upper outer shell and a lower outer shell which are partially fused to each other to form a plurality of first air cells at a central portion of the outer shells in a longitudinal direction relative to the outer shells, to form a plurality of second air cells spaced apart from each other by a certain distance at both sides of the central portion of the outer shells in the longitudinal direction relative to the outer shells, and to form an air injection path configured to inject air into the first and second air cells at a front end of the outer shells;
   and an upper inner shell and a lower inner shell which are interposed between the upper outer shell and the lower outer shell and are partially fused to each other to form air inflow paths configured to allow the first air cells and the second air cells to communicate with each other,
   wherein the upper outer shell and the lower outer shell are partially fused to form longitudinal fused portions at the central portion of the outer shells, to respectively form transverse fused portions at a front end and a rear end of the longitudinal fused portions, and to form the plurality of first air cells which extend in the lengthwise longitudinal direction relative to the outer shells,
   auxiliary longitudinal fused portions formed between an upper end and a middle portion of each of both sides of the outer shells and between the middle portion and a lower end of each of the both sides of the outer shells in the longitudinal direction relative to the other shells,
   auxiliary transverse fused portions formed at a front end and a rear end of the auxiliary longitudinal fused portions to form a plurality of second air cells spaced apart from each other in the longitudinal direction of the outer shells,
   air injection guide paths, configured to allow the air inflow paths formed in the upper and lower inner shells and the second air cells formed between the upper end and the middle portion of the outer shells to communicate with each other, are formed at upper ends of the both sides of the upper and lower outer shells, and air injection guide paths, configured to allow the second air cells formed between the upper end and the middle portions of the outer shells and the second air cells formed between the middle portion and the lower end of the outer shells, are formed at the middle portions of the both sides of the upper and lower outer shells to communicate with each other, wherein the shock-absorbing packing material is foldable into a shape in which a front end and a rear end thereof come into contact with each other to enable both side edges of the folded shock-absorbing packing material to be fused to each other, and then enable air to be injected through the air injection path to form a front surface, a real surface, a bottom surface, upper covers of a packaging box through the plurality of first air cells, and concurrently enable both side portions, which are not portions of the outer shells comprising the second air cells of the outer shells to be tucked in the box to form both side walls of the box through the plurality of second air cells and to form a box shape.

2. The shock-absorbing packing box of claim 1, wherein in the shock-absorbing packaging materials a plurality of point fused portions are formed on the plurality of first air cells to fuse the upper outer shell and the lower outer shell such that the plurality of first air cells are folded to form the front surface, the rear surface, the bottom surface, and the upper covers of the packaging box.

3. The shock-absorbing packing box of claim 1, wherein in the shock-absorbing packaging material a pair of the upper covers are formed at the front end and the rear end of the shock-absorbing packaging material such that opposite ends of the covers overlap each other to cover an opened upper portion of the box.

4. The shock-absorbing packing box of claim 1, wherein a single-layered auxiliary inner shell is formed between the upper outer shell and the lower outer shell forming the first and second air cells so as to be alternately and partially fused with the upper outer shell and the lower outer shell, so that the first air cells and the second air cells formed between the upper outer shell and the lower outer shell are formed as a plurality of first air cells and a plurality of second air cells formed in a two-layered structure, which alternately stacked with each other.

5. The shock-absorbing packing box of claim 4, wherein a plurality of air flow holes are formed in the auxiliary inner shell such that a pair of air cells disposed in an upper layer and a pair of air cells disposed in a lower layer of the plurality of first air cells and the plurality of second air cells each formed in a two-layered structure communicate with each other.

6. The shock-absorbing packing box of claim 1, wherein at least two-layered auxiliary inner shell is formed between the upper outer shell and the lower outer shell forming the first and second air cells so as to be alternately and partially fused with the upper outer shell and the lower outer shell, so that the first air cells and the second air cells formed between the upper outer shell and the lower outer shell are formed as a plurality of first air cells and a plurality of second air cells formed in at least three-layered structure, which are alternately stacked with each other.

* * * * *

UNITED STATES PATENT AND TRADEMARK OFFICE
CERTIFICATE OF CORRECTION

PATENT NO. : 10,822,151 B2  
APPLICATION NO. : 16/081862  
DATED : November 3, 2020  
INVENTOR(S) : Kim Page 1 of 1

It is certified that error appears in the above-identified patent and that said Letters Patent is hereby corrected as shown below:

In the Claims

| Column | Line | |
|---|---|---|
| 20 | 41 | Please delete "which are" before "interposed" |
| 20 | 52 | Please delete "lengthwise" before "longitudinal" |

Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*